United States Patent
De Lange et al.

(10) Patent No.: US 12,451,851 B2
(45) Date of Patent: Oct. 21, 2025

(54) PARAMETRIC AMPLIFIER AND USES THEREOF

(71) Applicant: Microsoft Technology Licensing, LLC, Redmond, WA (US)

(72) Inventors: Gijsbertus De Lange, Schiphol (NL); Wolfgang Pfaff, Delft (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 775 days.

(21) Appl. No.: 17/756,036

(22) PCT Filed: Nov. 15, 2019

(86) PCT No.: PCT/EP2019/081549
§ 371 (c)(1),
(2) Date: May 13, 2022

(87) PCT Pub. No.: WO2021/093977
PCT Pub. Date: May 20, 2021

(65) Prior Publication Data
US 2022/0407482 A1 Dec. 22, 2022

(51) Int. Cl.
*H03F 3/195* (2006.01)
*G06N 10/00* (2022.01)
(Continued)

(52) U.S. Cl.
CPC ............. *H03F 19/00* (2013.01); *G06N 10/00* (2019.01); *H10N 60/12* (2023.02); *H10N 60/805* (2023.02); *H10N 69/00* (2023.02)

(58) Field of Classification Search
CPC ................................ H03K 17/92; H03F 3/195
(Continued)

(56) References Cited

U.S. PATENT DOCUMENTS

| | | | |
|---|---|---|---|
| 10,461,445 B2 * | 10/2019 | Najafi | ................ H01R 4/68 |
| 2017/0116542 A1 | 4/2017 | Shim et al. | |
| 2017/0133576 A1 | 5/2017 | Marcus et al. | |

FOREIGN PATENT DOCUMENTS

| | | |
|---|---|---|
| EP | 0371426 | 6/1990 |
| JP | H08-306973 | 11/1996 |
| WO | WO 2019/180267 | 9/2019 |

OTHER PUBLICATIONS

Yamamoto, et al., "Flux-driven Josephson parametric amplifier", In Repository of arXiv:0808.1386v1, Aug. 10, 2008, 04 Pages.
(Continued)

*Primary Examiner* — Henry Choe
(74) *Attorney, Agent, or Firm* — Klarquist Sparkman, LLP

(57) ABSTRACT

A parametric amplifier for amplifying an input signal includes a resonator comprising a Josephson junction. The Josephson junction comprises a first superconductor component, a second superconductor component and a semiconductor component. The semiconductor component is configured to enable coupling of the first and second superconductor components. The parametric amplifier further comprises a gate electrode configured to apply an electrostatic field to the semiconductor component of the Josephson junction for tuning the parametric amplifier. Such parametric amplifiers are useful for amplifying signals in the microwave frequency range. Tuning the junction by electrostatic gating may allow for improved scalability compared to tuning using magnetic flux. Also provided are the use of the parametric amplifier to amplify a signal; and a method of amplifying a signal.

19 Claims, 4 Drawing Sheets

(51) Int. Cl.
*H03F 19/00* (2006.01)
*H10N 60/12* (2023.01)
*H10N 60/80* (2023.01)
*H10N 69/00* (2023.01)

(58) Field of Classification Search
USPC .......................................... 330/307; 327/367
See application file for complete search history.

(56) References Cited

OTHER PUBLICATIONS

Larsen, et al., "A Semiconductor Nanowire-Based Superconducting Qubit", In Repository of arXiv:1503.08339v1, Mar. 28, 2015, 05 Pages.

Bergeal, et al., "Phase preserving amplification near the quantum limit with a Josephson Ring Modulator", In Repository of arXiv:0912.3407v1, Dec. 17, 2009, 20 Pages.

Casparis, et al., "Superconducting Gatemon Qubit based on a Proximitized Two-Dimensional Electron Gas", In Repository of arXiv:1711.07665v3, Dec. 8, 2017, 06 Pages.

Devoret, et al., "Introduction to Quantum-limited Parametric Amplification of Quantum Signals with Josephson Circuits", In Repository of arXiv:1605.00539v2, May 25, 2016, 28 Pages.

Pankratova, et al., "The Multi-Terminal Josephson Effect", In Repository of arXiv:1812.06017v1, Dec. 14, 2018, 7 Pages.

Lange, et al., "Realization of microwave quantum circuits using hybrid superconducting-semiconducting nanowire Josephson elements", In Repository of arXiv:1503.08483v1, Mar. 29, 2015, 15 Pages.

Amin et al., "DC Squid based on the mesoscopic multiterminal Josephson junction," *Physica C: Superconductivity*, 372, 11 pp. (2002) (corresponding to arXiv.org, Sep. 21, 2001).

Akazaki et al., "A Josephson field effect transistor using an InAs-inserted-channel $In_{0.52}Al_{0.48}As/In_{0.53}Ga_{0.47}As$ inverted modulation-doped structure," *Applied Physics Letters*, 68 (3), pp. 418-420 (1996).

Graziano et al, "Transport studies in a gate-tunable three-terminal Josephson junction," *Physical Review B*, 101 (5), 7 pp. (2020)(corresponding copy from arXiv.org, Feb. 24, 2020).

International Search Report and Written Opinion dated Jul. 30, 2020 from International Patent Application No. PCT/EP2019/081549, 15 pp.

Yan-Sun et al., "Dynamic behaviour of a single-Cooper-pair box in a single-mode quantized field with dissipation," *Chinese Physics*, 11 (11), 6 pp. (2002).

Decision to grant a European patent pursuant to Article 97(1) received in European Application No. 19816209.1, mailed on Jan. 8, 2025, 2 pages.

Communication under Rule 71(3) Received in European Patent Application No. 19816209.1, mailed on Oct. 2, 2024, 06 pages.

\* cited by examiner

PARAMETRIC AMPLIFIER AND USES THEREOF

CROSS REFERENCE TO RELATED APPLICATIONS

This is the U.S. National Stage of International Application No. PCT/EP2019/081549, filed Nov. 15, 2019, which was published in English under PCT Article 21 (2), and which is incorporated by reference herein in its entirety.

BACKGROUND

A Josephson junction is a device which comprises two superconductors spaced from one another by a non-superconductive component. The non-superconductive component is configured to allow a supercurrent to flow between the two superconductors by quantum tunnelling. If the magnitude of the supercurrent exceeds a particular limit, referred to as the critical current $I_c$, then the non-superconductive component becomes resistive. The critical current depends on the area of the junction and the thickness of the non-superconductive component, for example.

Parametric amplifiers based on Josephson junctions have been reported. The Josephson junctions in these devices typically use aluminium as the superconducting component, and a thin aluminium oxide barrier as the non-superconductive component. Tuning of such parametric amplifiers is achieved by applying a magnetic field to vary the properties of the Josephson junction. Various amplifier circuit designs based on magnetically-tuned Josephson junctions have been proposed. For example, Devoret and Roy (Comptes Rendus Physique, 17, 7, 740-755 (2016); arXiv:1605.00539v2), the content of which is hereby incorporated by reference, describe several different parametric amplifier circuits based on magnetically-tuned Josephson junctions.

SUMMARY

A parametric amplifier for amplifying an input signal includes a resonator comprising a Josephson junction. The Josephson junction comprises a first superconductor component, a second superconductor component and a semiconductor component. The semiconductor component is configured to enable coupling of the first and second superconductor components. The parametric amplifier further comprises a gate electrode configured to apply an electrostatic field to the semiconductor component of the Josephson junction for tuning the parametric amplifier. Such parametric amplifiers are useful for amplifying signals in the microwave frequency range. Tuning the resonator by electrostatic gating of the junction may allow for improved scalability compared to tuning using magnetic flux. Also provided are the use of the parametric amplifier to amplify a signal; and a method of amplifying a signal.

Pumping of the parametric amplifier is achieved electrostatically. The electrostatic field applied by the gate electrode may further be for pumping the parametric amplifier. Alternatively, a microwave signal may be injected into a further resonator in communication with the Josephson junction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

Figure 1:
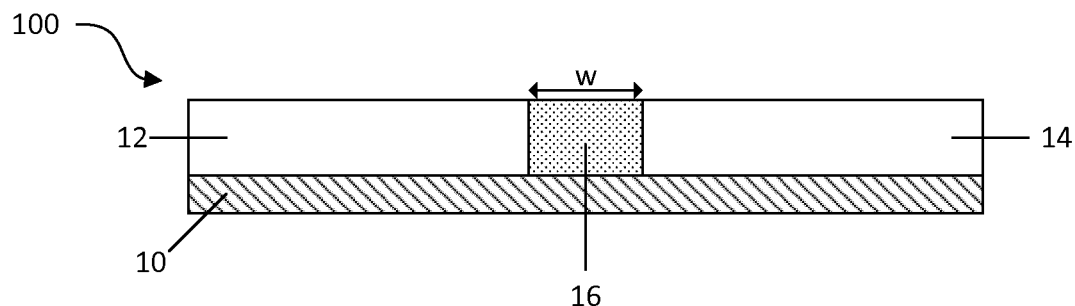
FIG. 1 is a schematic cross-section of a first Josephson junction topology.

The drawings are schematic, and are not to scale. The relative proportions of certain components is exaggerated for ease of representation, and certain details are omitted for clarity.

DETAILED DESCRIPTION OF EMBODIMENTS

As used herein, the verb 'to comprise' is used as shorthand for 'to include or to consist of'. In other words, although the verb 'to comprise' is intended to be an open term, the replacement of this term with the closed term 'to consist of' is explicitly contemplated, particularly where used in connection with chemical compositions.

Directional terms such as "top", "bottom", "left", "right", "above", "below", "horizontal" and "vertical" are used herein for convenience of description and relate to a device in the orientation shown in FIGS. 1 to 3. For the avoidance of any doubt, this terminology is not intended to limit the orientation of the device in an external frame of reference.

As used herein, the term "superconductor" refers to a material which becomes superconductive when cooled to a temperature below a critical temperature, $T_c$, of the material. The use of this term is not intended to limit the temperature of the device.

An "elongate piece of semiconductor" as referred to herein typically has a length of the order of micrometers, e.g. at least 1 µm, or at least 10 µm. Certain examples of elongate pieces of semiconductors are nanowires, which have a nano-scale width, and may have a length-to-width ratio of at least 100, or at least 500, or at least 1000. An example of a nanowire has a width in the range 10 to 500 nm, optionally 50 to 100 nm or 75 to 125 nm.

The content of all documents cited herein is hereby incorporated by reference in its entirety.

The parametric amplifiers provided herein are based on electrostatically gated Josephson junctions. Existing parametric amplifiers based on Josephson junctions use varying magnetic flux to provide pumping and tuning of the amplifier. The magnetic flux is generated by passing a varying electric current through a conductor, e.g. a coil. Resistance to the flow of current generates heat. Josephson junctions are based on superconductors, and superconductivity is observed only at temperatures close to absolute zero. Heat generation limits device scalability, since cooling systems have a finite cooling capacity. Electrostatic gating does not require current flow, thus generates less heat. Scalability is therefore improved. This may allow for the construction of larger, more complex quantum computing devices, for example.

Any Josephson junction topology may be adapted to allow for electrostatic gating, provided that the material used as the non-superconductive component is a semiconductor. Semiconductors have a carrier density that can be modified by applying an electrostatic field to the semiconductor. Three illustrative examples of junction topologies will now be described with reference to FIGS. 1 to 3.

A first example of a topology for a Josephson junction 100 will now be described with reference to FIG. 1.

Josephson junction 100 includes a first superconductor component 12, a second superconductor component 14, and a semiconductor component 16 arranged on a substrate 10. In this example, the first and second superconductor components 12, 14 are arranged on either side of semiconductor component 16. A gate electrode 20 is arranged over the semiconductor component 16. The gate electrode 20 is separated from the semiconductor component 16 by a dielectric 18. In the present example, the dielectric also extends over the first and second superconductor components 12, 14.

The first and second super conducting components 12, 14 are separated from one another by the semiconductor component 16. The semiconductor component 16 is selected and dimensioned to allow for flow of a supercurrent between the first superconductor component 12 and the second superconductor component 14 by quantum tunnelling.

The semiconductor component 16 has a width, w. The degree of coupling between the first and second superconducting components 12, 14 decreases as the width w increases. By selecting width w appropriately, properties of Josephson junction 100 such as its critical current $I_c$ may be controlled. This may be useful for constructing a parametric amplifier having a desired resonant frequency. The width w is typically of the order of 10 s to 100 s of nm, e.g. 10 to 200 nm.

The first and second superconductor components 12, 14 are arranged on a base 10. The base 10 provides physical support for the Josephson junction. FIG. 2 shows a second example of a topology for a Josephson junction 200. As in the first example, Josephson junction 200 includes first and second superconductor components 10, 12, and a semiconductor component 16, all of which are arranged over a base 10.

In the present example, the first superconductor component 12 is arranged on the base 10. First superconductor component 12 covers a portion of the base 10. Semiconductor component 16 is arranged on the first superconductor component. The semiconductor component 16 also extends over second portion of the base 10. The second superconductor component 14 is arranged on the semiconductor component 16. The second superconductor component partially covers the semiconductor component 16. A portion of the second superconductor component 14 is arranged over a portion of the first superconductor component 12.

Figure 2:
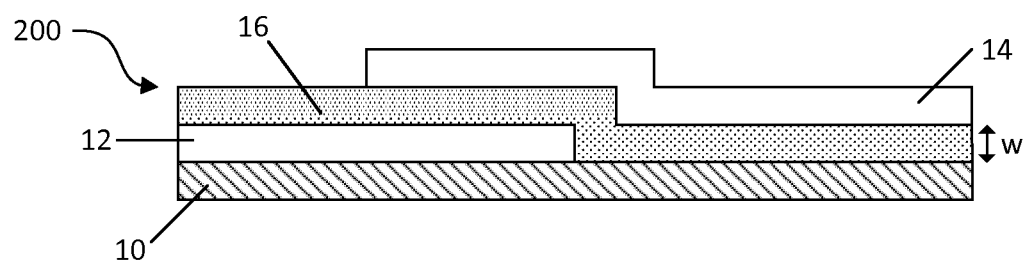
FIG. 2 is a schematic cross-section of a second Josephson junction topology.

The FIG. 2 device includes a sandwich structure, in which semiconductor is arranged between first and second superconductor components. In this sense, the FIG. 2 device is similar to the FIG. 1 device. However, the components of the sandwich structure are arranged in a vertical stack, rather than side-by-side as in the FIG. 1 device.

As with the FIG. 1 device, the degree of coupling between the first and second superconductor components may be controlled by selecting the width w of the semiconductor component 16. In the FIG. 2 example, width w is the vertical height of the semiconductor component 16, rather than horizontal thickness as in the FIG. 1 example.

In the FIG. 2 example, the left- and right-hand sides of the device include respective regions where only one of the superconductor components is present. This allows for easier termination of the first and second semiconductor components. One variant of the FIG. 2 example omits these regions, and is arranged as a simple vertical stack of the first superconductor component, semiconductor component, and second superconductor component.

Figure 3:
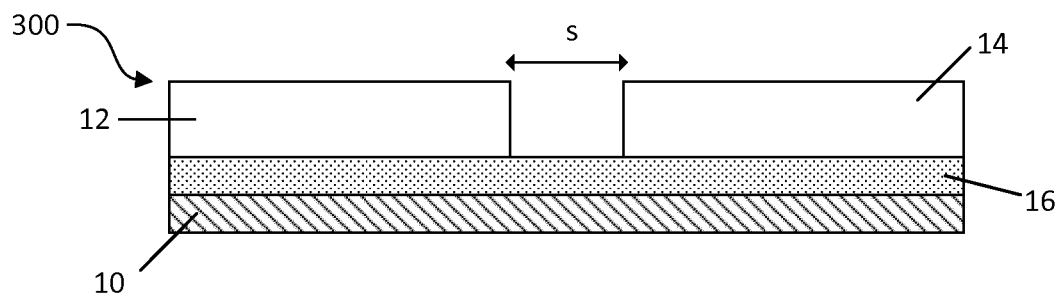
FIG. 3 is a schematic cross-section of a third Josephson junction topology.

FIG. 3 shows a still further example of a topology for a Josephson junction. The FIG. 3 example illustrates that it is not essential for a Josephson junction to be arranged as a sandwich structure, provided that the two superconductors are capable of interacting with one another via a semiconductor. This device topology may be preferred for some applications, as this type of device may be readily manufactured using methods such as selective area growth.

The FIG. 3 device again includes first and second superconductor components 12, 14, and a semiconductor component 16.

In this example, semiconductor component 16 is arranged as a layer on a base 10. First and second superconductor components 12, 14 are arranged on the semiconductor component 16. The first and second superconductor components 12, 14 are separated from one another by a space, s. Space s may have a width in the range 100 to 500 nm, for example.

The first and second superconductor components 12, 14 in this example are both in contact with semiconductor component 16. Since flow of electrons through semiconductor component 16 is possible, the first and second superconductor components 12, 14 can interact.

In the FIG. 3 example, the degree of coupling between the first and second superconductor components 12, 14 may be selected by controlling the size of space s, rather than by controlling width of a semiconductor component as in the FIGS. 1 and 2 examples.

The Josephson junctions used in the parametric amplifiers of the present disclosure are electrostatically-gated. A gate electrode configured to apply an electrostatic field to the semiconductor component 16 is provided. The voltage of the electrostatic field controls the number of available charge carriers in the semiconductor component 16. This, in turn, allows for tuning of the behaviour of the junction. A dielectric for preventing flow of current from the gate electrode is arranged between the gate electrode and the semiconductor and superconductor components. The dielectric may comprise a layer of a material, or an air gap, or a combination thereof, depending on the configuration of the gate electrode. The skilled artisan will be familiar with the electrostatic gating of components.

The position of the gate electrode within the device may be selected as appropriate depending on the configuration of the semiconductor and superconductor components. The Josephson junction may be top-gated, side-gated, or bottom gated.

In a top-gated configuration, the gate electrode is arranged over at least the semiconductor component. Top-gated configurations include a layer of dielectric material between the gate electrode and further components of the device.

For example, to modify the FIG. 1 device to include a top gate, a layer of dielectric material would be arranged on top of at least the semiconductor component 16. The layer of dielectric material would typically cover at least a portion of the first and second superconductor components 12, 14 adjacent to the semiconductor component 16. The gate electrode would be arranged on top of the dielectric layer.

In a side-gated configuration, the gate electrode is arranged to one side of the semiconductor component. The gate electrode is spaced from the components by an air gap. The distance between the gate electrode and the components is typically at least 50 nm, e.g. 100 to 800 nm, or 300 to 500 nm. A layer of dielectric material may alternatively or additionally be included.

An example of a side-gated device is discussed further below, with reference to FIG. 4. Side-gating may be applied to any device topology.

In a bottom-gated configuration, the gate electrode is arranged under the base 10 of the device. In such a configuration, the base 10 may act as the dielectric for preventing current flow into the remaining components. For bottom-gated devices, a separate dielectric may be needed only if the semiconductor is of the same material as the substrate.

Details of various components for Josephson junctions will now be described. It will be appreciated that these details are applicable to any of the device topologies discussed above with reference to FIGS. 1 to 3, or to any other appropriate topology.

The nature of the base 10 is not particularly limited, provided that it does not interfere with operation of the junction. Any suitable substrate may be used. Base 10 may be a substrate of a chip on which the Josephson junction is formed. Alternatively, base 10 may be arranged as an elongate piece of semiconductor material. The semiconductor component 16 and substrate 10 may be formed of the same material, or different materials.

The material used to form the semiconductor component 16 is not particularly limited, provided that it allows for passage of a supercurrent by quantum tunnelling and has a carrier density that can be modified by applying an electrostatic field to the semiconductor via gate electrode 20. A wide variety of semiconductor materials having suitable properties are known.

Illustrative examples of useful semiconductor materials include III-V semiconductors, particularly those of Formula I:

$$InAs_xSb_{1-x} \quad (1)$$

where X is in the range 0 to 1. In other words, semiconductor component 16 may comprise indium antimonide (x=0), indium monoarsenide (x=1), or a ternary mixture comprising 50% indium on a molar basis and variable proportions of arsenic and antimony (0<x<1). Materials in this class are reported to be particularly useful for forming Josephson junctions with superconductors (see, e.g. Larsen et al, Phys. Rev. Lett. 115, 127001 (2015) (available at arXiv: 1503.08339v1 [cond-mat.mes-hall]); de Lange et al (Phys. Rev. Lett. 115, 127002 (2015) (available at arXiv: 1503.08483v1 [cond-mat.mes-hall]); and Casparis et al (Nature Nanotechnology 13, 915 (2018) (available at arXiv: 1711.07665v3 [cond-mat.mes-hall]).

Indium monoarsenide, InAs, has been found to have good handling properties during manufacture of the device, and provides devices with good performance. Indium antimonide, InSb, provides further improvements to device performance but may be more difficult to use during manufacturing processes. The ternary mixtures have intermediate properties between those of the binary compounds InAs and InSb. Improvements in device performance compared to InAs may be observed when x is in the range 0 to 0.7, or 0.01 to 0.7. Values of x in the range 0.35 to 0.45 may provide a particularly good balance of device performance and handling properties.

Superconductor components 12, 14 may be formed from any superconductive material. Illustrative examples of superconductive materials include aluminium, lead, indium, tin, and niobium alloys such as NiTi and NbTiN. NbTiN may be preferred for some applications.

The degree of coupling between the superconductor components 12, 14 and the semiconductor component 16 may vary depending on the thickness of the superconductor components 12, 14. This is one parameter which may allow control over the properties of the Josephson junction. The thickness may be selected as appropriate. In examples where the superconductor material is aluminium, the thickness may be in the range 4 to 10 nm, for example.

Superconductor components 12, 14 may be configured as transmission lines of a transmission line resonator. In a transmission line resonator, the lengths of the transmission lines may influence the resonance frequency of the resonator. The lengths of the superconductor components may be selected as appropriate depending on the expected frequencies of the signals to be amplified.

The construction of the gate electrode is not particularly limited, provided that it is capable of applying an electrostatic field to the semiconductor component 16. Illustrative examples of materials suitable for constructing gate electrodes include gold, and gold-titanium alloys. The gate electrode is typically not superconductive.

In examples which include a layer of dielectric material is used, the dielectric material may be any of the various materials used in semiconductor devices for preventing flow of current from a gate electrode component. Illustrative examples of such materials include silicon nitride, as well as oxides such as hafnium oxide, silicon oxides, and aluminium oxides.

Figure 4:
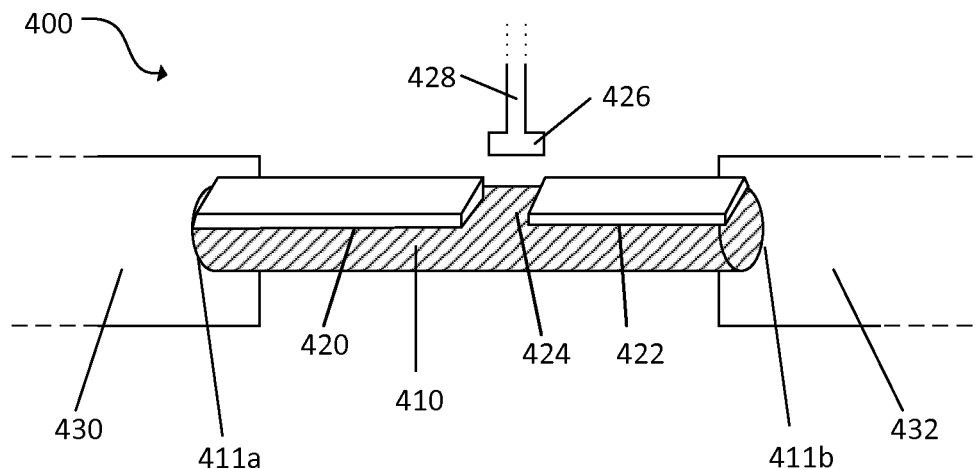
FIG. 4 is a simplified plan view of a transmission line resonator including a Josephson junction of the FIG. 3 topology.

FIG. 4 shows a plan view of a transmission line resonator device 400 incorporating a Josephson junction having a topology as described with reference to FIG. 3. The Josephson junction in this example is side-gated.

Device 400 is typically arranged on a substrate of a chip. Electrical grounding is typically provided around the device 400. Grounding, where present, is spaced from the device by a distance of tens of micrometers. The various transmission lines may be arranged in spaces in the electrical grounding. The substrate and grounding are omitted from the drawing for clarity.

The properties of a resonator circuit may depend on how voltages in various parts of the circuit can oscillate. These voltages may be dependent on the capacitance between the parts and ground. Ground represents the 'reference' electromagnetic potential. Providing grounding gives a well-defined reference potential, and may reduce susceptibility to fluctuations and noise. The precise form of the components used to provide grounding is, however, not particularly limited. Any configuration which gives a well-defined ground potential may be used.

Device 400 includes an elongate piece of semiconductor 410 having ends 411a, 411b. Semiconductor 410 serves as the semiconductor component of the Josephson junction.

The superconductor components of the Josephson junction take the form of first and second strips 420, 422 of superconductor material arranged on the semiconductor 410. The superconducting components 420, 422 extend from the ends 411a, 411b of the semiconductor 410 toward one another. A gap 424 separates the first and second strips 420, 422. In use, first and second strips 420, 422 are coupled via semiconductor 410. The semiconductor 410 and first and second strips 420, 422 thus provide a Josephson junction having the topology illustrated in FIG. 3.

One end of each of the first and second strips 420, 422 is connected to a respective transmission line 430, 432. The Josephson junction 410, 420, 422, together with the transmission lines 430, 432 form a transmission line resonator.

In an assembled parametric amplifier, transmission lines 430, 432 may be connected to further components via respective capacitors and optionally communication transmission lines. The further components may be arranged as an integrated circuit with the Josephson junction on a common die, or as external components, or as a combination thereof. The term "communication transmission line" as used herein refers to a transmission line which is not part of a transmission line resonator.

One useful technique for providing capacitors in the devices provided herein is to include gaps between components. For example, to provide a capacitor between a transmission line of a transmission line resonator and a communication transmission line, an end of the transmission line may be spaced from an end of communication transmission line by a gap. Appropriately-sized gaps between components or breaks within a line provide capacitance. The gaps or breaks typically have lengths in the range 1 µm to 100 µm. The example parametric amplifier circuits described herein include capacitors on either side of the transmission line resonators.

A gate electrode 426 is provided for applying an electrostatic field to the junction. Gate electrode 426 is arranged on the substrate of the chip. The gate electrode 426 is arranged to one side of the nanowire. In the present example, current flow from the gate electrode 426 to the junction is prevented by an air gap. The distance between the gate electrode 226 and the junction may be, for example, 10 to 500 nm, optionally 100 to 500 nm.

Figure 5:
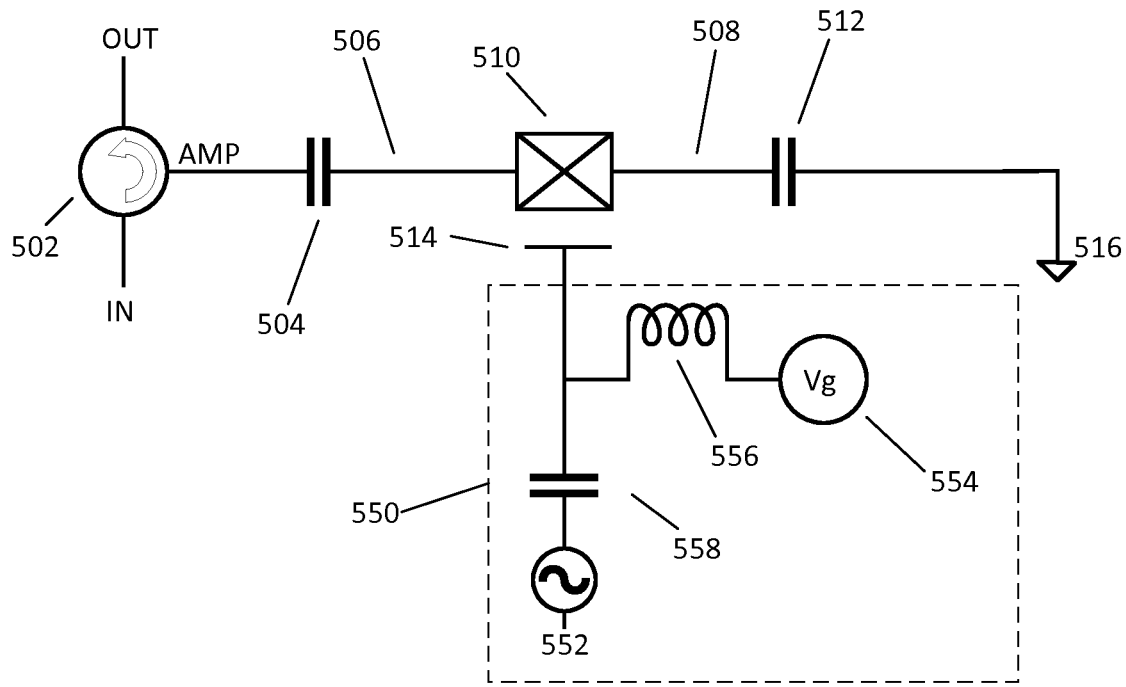
FIG. 5 is a diagram of a first example of a parametric amplifier circuit.

A first example of a parametric amplifier based on a gated Josephson junction will now be explained with reference to FIG. 5. FIG. 5 is a circuit diagram of the parametric amplifier. This example is a 1-port, degenerate amplifier.

The example parametric amplifier circuit shown in FIG. 5 includes a circulator 502 having three terminals, labelled as IN, AMP and OUT. The circulator 502 receives an input signal having a particular frequency via the IN terminal. The signal is passed into the amplifying part of the circuit via the AMP terminal. The circulator further receives, via the AMP terminal, an amplified signal from the amplifying part and passes this signal to an output, OUT. The amplified signal has the same frequency as the input signal, but an increased voltage.

The AMP terminal of the circulator 502 is connected to a first transmission line 506 of a transmission line resonator via a coupling capacitor 504. The transmission line resonator of this example comprises a first transmission line 506 connected to a second transmission line 508 by a Josephson junction 510. A second terminal of the transmission line resonator 510 is connected to an open circuit, in this example a capacitor 512 connected to ground 516. This configuration provides a half-wave resonator. In a variant, which provides a quarter-wave resonator, the transmission line resonator is shorted through the Josephson junction to ground.

More generally, a Josephson junction is included in an inductive part of a resonance circuit. The location of the inductive part depends on how the inductive part is terminated, and on the mode profile of the resonator. The inductive part is arranged to be at a current anti-node.

Further included is a gate electrode 514. Gate electrode 514 is configured to apply an electrostatic field to the Josephson junction. The electrostatic field provides gating and pumping.

In this example, the gating and pumping voltages are provided by a subsystem 550.

The subsystem 550 for providing gating and pumping includes a source 554 of a gating voltage $V_g$ and a source 552 of a pumping signal, which are connected to the gate electrode 514 via a bias-tee. The voltage of the pumping signal is generally much less than the gating voltage $V_g$. The source 554 of the gating voltage $V_g$ provides a relatively high voltage for gating the Josephson junction 510.

The bias-tee has a transmission line 560 to which source 552 of the pumping signal and source 554 of the gating voltage are connected. Source 552 of the pumping signal is protected from the voltage $V_g$ by a capacitor 558. Source 554 of the gating voltage $V_g$ connects to the transmission line via an inductor 556.

In this example, the source 552 of the pumping signal is a microwave generator. The microwave generator provides an alternating voltage at a frequency in the microwave range, i.e. 50 MHz to 100 GHz, or 100 MHz to 20 GHz, for example. The pumping signal is mixed with the input signal to achieve amplification of the input signal.

The device of this example receives the input signal from and delivers the amplified signal to the first transmission line 506 of the transmission line resonator comprising the Josephson junction. In a variant, the second transmission line 508 of the transmission line resonator could be connected to components for receiving an amplified signal, rather than being connected to an open circuit as in the illustrated example. In such a variant, circulator 502 may be omitted.

A second example of a parametric amplifier will now be described with reference to FIGS. 6 and 7. This example is a non-degenerate amplifier, and differs from the FIG. 5 example in that the Josephson junction couples two transmission line resonators, as opposed to one. The second transmission line resonator is for generating an idler mode.

Figure 6:
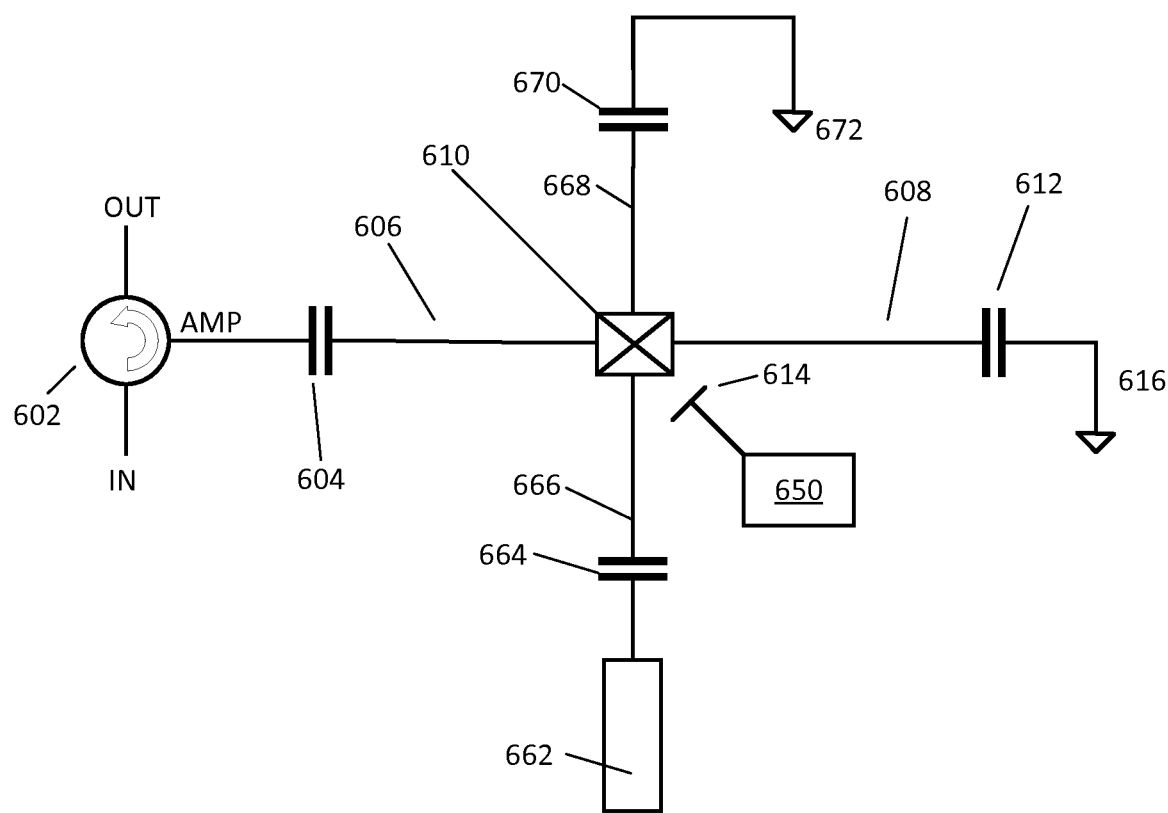
FIG. 6 is a diagram of a second example of a parametric amplifier circuit.

As in the FIG. 5 example, the FIG. 6 example includes a circulator 602 having IN, AMP, and OUT terminals. The AMP terminal is connected to one end of a first transmission line 606 via a capacitor 604. A second end of first transmission line 606 communicates with a second transmission line 608 via a Josephson junction 610. The second transmission line is connected an open circuit, in this example represented by connection to ground 616 via a capacitor 612. The first transmission line, Josephson junction, and second transmission line together represent a first transmission line resonator. A gate electrode 614 for applying an electrostatic field to Josephson junction is provided. The electrostatic field is generated by a subsystem 650, which has the same configuration as the subsystem 550 of the FIG. 5 example.

Josephson junction 610 further forms part of a second transmission line resonator. The second transmission line resonator comprises the Josephson junction 610, a third transmission line 666 and a fourth transmission line 668. Similar to the first and second transmission lines, the third and fourth transmission lines are superconductor components.

One end of the third transmission line 666 is connected to an impedance 662 via a capacitor 664. Impedance 662 may be a resistor, having a resistance of at least 50Ω. One end of the fourth transmission line 668 is connected to an open circuit, represented by capacitor 670 and ground 672.

The second transmission line resonator generates an idler mode, allowing for non-degenerate amplification.

Figure 7:
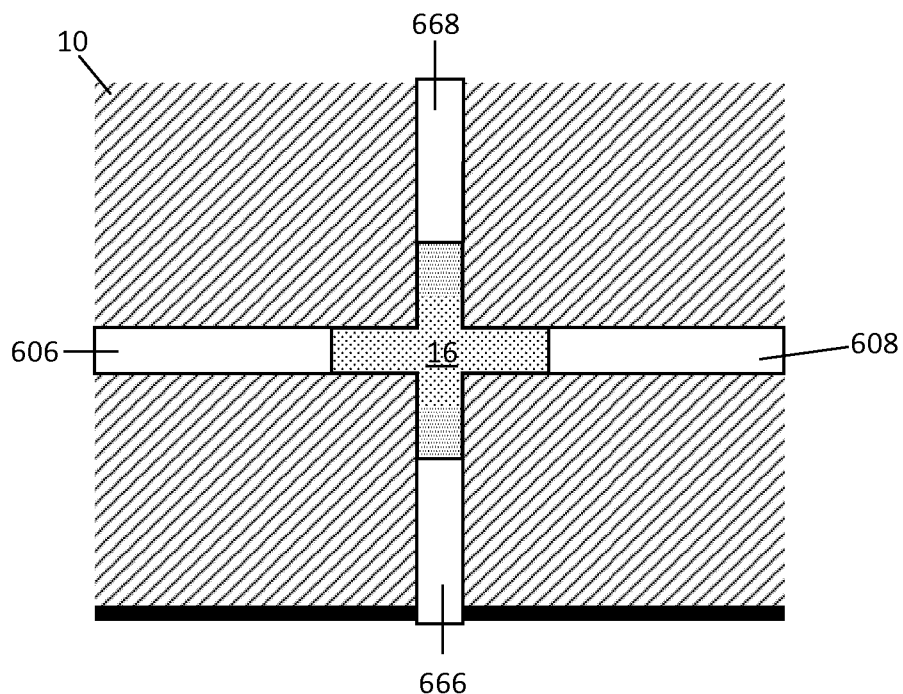
FIG. 7 is a plan view of a multi-terminal Josephson junction useful in the circuit of FIG. 6.

FIG. 7 shows a plan view of one example of a four-terminal Josephson junction 610.

The Josephson junction is formed on a base 10. The Josephson junction includes a semiconductor component 16, which in this example has a cruciform shape having four arms. Respective transmission lines 606, 608, 666, 668 are arranged adjacent to each arm of the semiconductor component. The transmission lines are superconductor components.

In this configuration, current through the semiconductor couples together all of the superconductor components.

Although the present example uses a cruciform semiconductor component, the geometry of the semiconductor component for a multi-terminal Josephson junction is not particularly limited and may be adjusted as appropriate. Multi-terminal Josephson junctions have been described by Pankratova et al (arXiv:1812.06017v1 [cond-mat.supr-con]), the content of which is hereby incorporated by reference.

Figure 8:
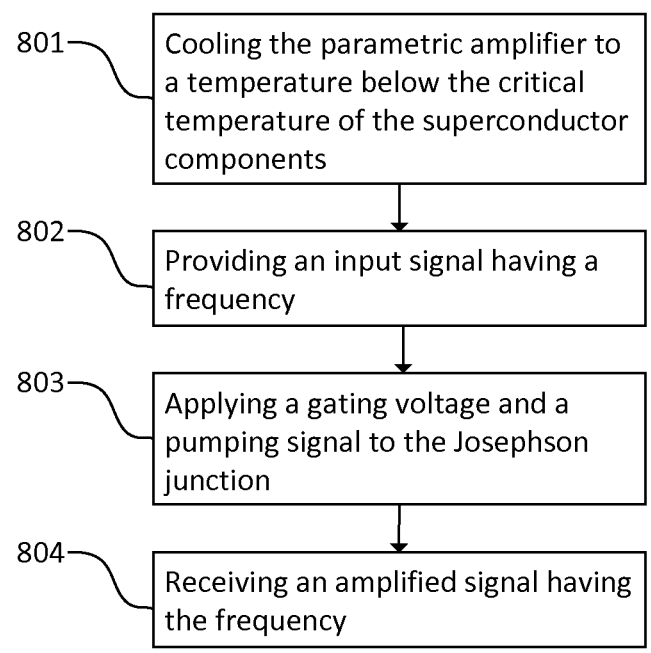
FIG. 8 is a flow chart outlining a method of using a parametric amplifier.

A method of using a parametric amplifier will now be described with reference to the flowchart shown in FIG. 8.

At block 801, the parametric amplifier is cooled to a temperature which is below the critical temperature $T_c$ of the superconducting components, such that the superconducting components display superconductive behaviour. $T_c$ is usually below about 10 Kelvin.

At block 802, the amplifier receives a signal to be amplified. The signal is a low amplitude oscillation of electron density, i.e. a low voltage alternating current having a particular frequency. The signal may, for example, encode a quantum bit ("qubit"). The frequency of the signal is generally in the microwave range.

At block 803, a gating voltage and a pumping signal are applied to the Josephson junction. The pumping signal is mixed with the input signal, to generate an amplified signal which has the same frequency as the input signal but a greater magnitude (i.e, voltage).

At block 804, the amplified output signal is received. This signal may be passed to further components of a circuit. Further amplification steps may be performed before the signal is ultimately detected.

It will be appreciated that the above embodiments have been described by way of example only.

More generally, according to one aspect disclosed herein, there is provided a parametric amplifier for amplifying an input signal, including: a resonator comprising a Josephson junction; wherein the Josephson junction comprises a first superconductor component, a second superconductor component and a semiconductor component, the semiconductor component being configured to enable coupling of the first and second superconductor components; and wherein the parametric amplifier further comprises a gate electrode configured to apply an electrostatic field to the semiconductor component for tuning the parametric amplifier. The inclusion of the semiconductor allows for electrostatic gating and pumping of the Josephson junction. Generating an electrostatic field generates less heat than generating magnetic flux. Reduced heat generation is beneficial when constructing devices which make use of superconductivity, because cryogenic chambers have finite cooling capacity. This may be particularly advantageous for quantum computing applications.

The resonator may be a transmission line resonator. The resonator may be a lumped element resonator.

The Josephson junction may be comprised in a single resonator. Alternatively, the Josephson junction may be configured to couple two or more resonators.

The electrostatic field applied by the gate electrode may be for tuning and pumping the parametric amplifier. Alternatively, pumping could be achieved by injecting microwave signals into one or more resonators of the parametric amplifier.

Typically, the parametric amplifier is not tuned by magnetic flux. Typically, the parametric amplifier is not pumped by magnetic flux. Typically, the parametric amplifier does not include a coil for generating magnetic flux.

Any Josephson junction topology may be used.

For example, the first and second superconductor components may be arranged on the semiconductor component, and the first and second superconductor components may be spaced from one another. In this example, the first and second superconductor components may interact via the semiconductor component even though the semiconductor component is not between the first and second superconductor components. In such examples, the semiconductor component may be arranged as elongate piece of semiconductor, for example, a nanowire. Nanowire structures can be manufactured by various techniques, such as selective area growth, and may allow for a high level of control over the dimensions of the components of the Josephson junction.

In alternative examples, at least part of the semiconductor component is arranged between the first superconductor component and the second superconductor component. In other words, the first superconductor component, semiconductor component, and second superconductor component may be arranged in a sandwich structure. The sandwich structure may be arranged horizontally or vertically on a base or substrate.

The gate electrode may be a top gate, a side gate, or a bottom gate. The gate electrode may be in communication with a gate voltage source and a pumping signal source via a bias-Tee. Alternatively, the parametric amplifier may include a second electrode configured to apply a pumping signal to the semiconductor component to amplify the input signal.

Various parametric amplifiers may be constructed based on electrostatically gated and pumped Josephson junctions. Although particular examples of parametric amplifiers are disclosed herein, the principles underlying the invention may be extended to other parametric amplifiers.

In one example, the first superconductor component is in communication with a circulator via a capacitor, the circulator having an input terminal for receiving the input signal and an output terminal for outputting an amplified signal, and the second superconducting component is in communication with an open circuit. The open circuit may be a connection to ground, via a capacitor. This configuration is one example of a degenerate amplifier. In this example, the resonator is a transmission line resonator. The first superconductor component may represent a first transmission line of the transmission line resonator, and the second superconductor may represent a second transmission line of the transmission line resonator.

Certain examples of parametric amplifiers provided herein include a multi-terminal Josephson junction, further comprising at least a third superconductor component, the semiconductor component being configured to enable coupling of the superconductor components. In a multi-terminal Josephson junction, three or more superconductor components are coupled together via a shared semiconductor component. Prior devices which relied on magnetic tuning and pumping used loops of several Josephson junctions to achieve coupling effects. The use of a multi-terminal, electrostatically gated and pumped junction may allow for simplifications of parametric amplifier circuits.

In one example, the Josephson junction is a three-terminal Josephson junction. A first terminal is in communication with a source of the input signal, a second terminal is in communication with an idler, and a third terminal is in communication with a pump. In this example, the gate electrode is configured to apply an electrostatic field to the semiconductor component for tuning the parametric amplifier, but pumping of the parametric amplifier is provided via the third terminal.

One example of a parametric amplifier includes a multi-terminal Josephson junction having four superconductor components. In this example, the first superconductor component is in communication with a circulator via a capacitor, the circulator having an input terminal for receiving the input signal and an output terminal for outputting an amplified signal, and the second superconducting component is in communication with an open circuit. The third superconductor component is in communication with an impedance, and the fourth superconductor component is in communication with an open circuit so as to generate an idler mode. This example circuit provides a non-degenerate amplifier.

The parametric amplifiers provided herein may be configured to amplify an input signal having a frequency in the range 100 MHz to 10 GHz. In other words, the parametric amplifiers may be configured to amplify a signal in the microwave frequency range. Signals which are useful in the context of quantum computing, such as signals for reading qubits, generally have frequencies within this range. The operating frequency range of a particular amplifier may be selected by varying the dimensions of the components of the Josephson junction.

The parametric amplifiers provided herein may include a capacitor arranged between a source of the input signal and the Josephson junction. The capacitor may be a gap in a transmission line between the source of the input signal and the Josephson junction.

Another aspect provides a device, for example an integrated circuit, comprising at least two parametric amplifiers of the present disclosure arranged on a substrate. Since electrostatically-tuned and pumped parametric amplifiers generate less heat than amplifiers tuned and pumped by individual magnetic fluxes, multiple amplifiers may be included in a single device. The reduced heat load facilitates integrating large numbers of amplifiers (>10) on-chip or off-chip at the cold stage of a dilution refrigerator.

Another aspect provides a quantum computer device including a parametric amplifier of the present disclosure. By allowing for electrostatic as opposed to magnetic tuning of the amplifier, the amplifiers provided herein may have improved compatibility with components of quantum computers. Various components used in quantum computing are sensitive to the effects of magnetic fields. Further, the parametric amplifiers provided herein may be adapted to amplify signals in the microwave range. Signals encoding qubits typically have frequencies within this range.

Still another aspect provides the use of a Josephson junction in a parametric amplifier, wherein the Josephson junction is electrostatically tuned and electrostatically pumped. As described above, electrostatic tuning and gating allows for improved device scalability.

A still further aspect provides a method of amplifying a signal using the parametric amplifier as provided herein, which method comprises: cooling the parametric amplifier to a temperature below a critical temperature of the first and second superconductor components, such that the first and second superconductor components are superconductive; providing the signal to the parametric amplifier, the signal having a frequency and a first amplitude; applying a gating voltage using the gate electrode; applying a pumping signal to the Josephson junction; and receiving an amplified signal having the frequency and a second amplitude from the parametric amplifier, the second amplitude being greater than the first amplitude.

The signal to be amplified may be a probe signal for inferring the state of one or more quantum bits ("qubits"). A skilled artisan will be familiar with such probe signals.

The signal may have a frequency in the range 50 MHz to 20 GHz, e.g. 100 MHz to 10 GHz.

Other variants or use cases of the disclosed techniques may become apparent to the person skilled in the art once given the disclosure herein. The scope of the disclosure is not limited by the described embodiments but only by the accompanying claims.

The invention claimed is:

1. A parametric amplifier for amplifying an input signal, including:
   a resonator comprising a Josephson junction;
   wherein the Josephson junction comprises a first superconductor component, a second superconductor component and a semiconductor component, the semiconductor component being configured to enable coupling of the first and second superconductor components;
   wherein the parametric amplifier further comprises a gate electrode configured to apply an electrostatic field to the semiconductor component for tuning the parametric amplifier; and
   wherein the gate electrode is in communication with a gate voltage source and a pumping signal source via a bias-Tee.

2. The parametric amplifier according to claim 1, wherein the first and second superconductor components are arranged on the semiconductor component, and wherein the first and second superconductor components are spaced from one another.

3. The parametric amplifier according to claim 2, wherein the semiconductor component is an elongate piece of semiconductor.

4. The parametric amplifier according to claim 1, wherein at least part of the semiconductor component is arranged between the first superconductor component and the second superconductor component.

5. A parametric amplifier, comprising:
   a resonator comprising a Josephson junction,
   wherein the Josephson junction comprises a first superconductor component, a second superconductor component and a semiconductor component, the semiconductor component being configured to enable coupling of the first and second superconductor components,
   wherein the parametric amplifier further comprises a gate electrode configured to apply an electrostatic field to the semiconductor component for tuning the parametric amplifier,
   wherein the first superconductor component is in communication with a circulator via a capacitor, the circulator having an input terminal for receiving an input signal and an output terminal for outputting an amplified signal, and wherein the second superconducting component is in communication with an open circuit.

6. The parametric amplifier according to claim 1, which is configured to amplify an input signal having a frequency in the range 100 MHz to 10 GHz.

7. A parametric amplifier, comprising:
a resonator comprising a Josephson junction;
wherein the Josephson junction comprises a first superconductor component, a second superconductor component and a semiconductor component, the semiconductor component being configured to enable coupling of the first and second superconductor components;
wherein the parametric amplifier further comprises a gate electrode configured to apply an electrostatic field to the semiconductor component for tuning the parametric amplifier; and wherein the Josephson junction is a multi-terminal Josephson junction, further comprising at least a third superconductor component, the semiconductor component being configured to enable coupling of the superconductor components.

8. The parametric amplifier according to claim 7, wherein the multi-terminal Josephson junction includes first, second, third and fourth superconductor components, wherein the third superconductor component is in communication with an impedance, and the fourth superconductor component is in communication with an open circuit so as to generate an idler mode.

9. An integrated circuit comprising at least two parametric amplifiers as defined in claim 7 arranged on a substrate.

10. A quantum computer device including a parametric amplifier as defined in claim 8.

11. A method of amplifying an input signal using a parametric amplifier having a resonator comprising a Josephson junction, wherein the Josephson junction comprises a first superconductor component, a second superconductor component, and a semiconductor component, the semiconductor component being configured to enable coupling of the first and second superconductor components, and wherein the parametric amplifier further comprises a gate electrode configured to apply an electrostatic field to the semiconductor component for tuning the parametric amplifier, the method comprising:
cooling the parametric amplifier to a temperature below a critical temperature of the first and second superconductor components, such that the first and second superconductor components are superconductive;
providing the input signal to the parametric amplifier, the input signal having a frequency and a first amplitude;
applying a gating voltage using the gate electrode;
applying a pumping signal to the Josephson junction; and
receiving an amplified signal having the frequency and a second amplitude from the parametric amplifier, the second amplitude being greater than the first amplitude.

12. The method according to claim 11, wherein the input signal is a probe signal for inferring a state of one or more quantum bits.

13. The method according to claim 11, wherein the input signal has a frequency in the range 100 MHz to 10 GHz.

14. The method according to claim 11, wherein applying the pumping signal comprises applying the pumping signal using the gate electrode.

15. The method according to claim 14, wherein the gate electrode is in communication with a source of the gate voltage and source of the pumping signal via a bias-Tee.

16. The method according to claim 11, wherein the Josephson junction comprises first and second superconductor components arranged on the semiconductor component, and wherein the first and second superconductor components are spaced from one another.

17. The method according to claim 11, wherein the first superconductor component of the Josephson junction is in communication with a circulator via a capacitor, the circulator having an input terminal for receiving the input signal and an output terminal for outputting an amplified signal, and
wherein the second superconducting component of the Josephson junction is in communication with an open circuit.

18. The method according to claim 11, wherein the Josephson junction is a multi-terminal Josephson junction, further comprising at least a third superconductor component, the semiconductor component being configured to enable coupling of the superconductor components.

19. The method according to claim 18, wherein the multi-terminal Josephson junction includes first, second, third and fourth superconductor components, wherein the third superconductor component is in communication with an impedance, and the fourth superconductor component is in communication with an open circuit so as to generate an idler mode.

* * * * *